US 011409429B2

(12) United States Patent
Li et al.

(10) Patent No.: US 11,409,429 B2
(45) Date of Patent: Aug. 9, 2022

(54) FILE TRANSFER METHOD AND APPARATUS

(71) Applicant: Beijing Xiaomi Mobile Software Co., Ltd., Beijing (CN)

(72) Inventors: Jiayi Li, Beijing (CN); Ming Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/689,598

(22) Filed: Nov. 20, 2019

(65) Prior Publication Data

US 2020/0371655 A1 Nov. 26, 2020

(30) Foreign Application Priority Data

May 20, 2019 (CN) .......................... 201910419550.X

(51) Int. Cl.
*G06F 3/0486* (2013.01)
*G06F 3/04817* (2022.01)
*H04L 12/18* (2006.01)
*H04L 67/06* (2022.01)
*H04L 67/75* (2022.01)

(52) U.S. Cl.
CPC ........ *G06F 3/0486* (2013.01); *G06F 3/04817* (2013.01); *H04L 12/1868* (2013.01); *H04L 67/06* (2013.01); *H04L 67/36* (2013.01)

(58) Field of Classification Search
CPC .. G06F 21/606; G06F 13/385; G06F 16/2379; G06F 16/245; G06F 16/2457; G06F 21/445; G06F 21/32
See application file for complete search history.

(56) References Cited

U.S. PATENT DOCUMENTS

| 5,801,700 | A | 9/1998 | Ferguson | |
|---|---|---|---|---|
| 7,031,004 | B1* | 4/2006 | Hayward | G06F 3/1204 358/1.13 |
| 2006/0083187 | A1* | 4/2006 | Dekel | H04W 12/068 370/310 |
| 2007/0157101 | A1 | 7/2007 | Indiran et al. | |
| 2008/0016453 | A1 | 1/2008 | Quillen et al. | |
| 2008/0100532 | A1 | 5/2008 | Lee et al. | |
| 2008/0307367 | A1 | 12/2008 | Garrison et al. | |
| 2009/0228820 | A1 | 9/2009 | Kim et al. | |

(Continued)

FOREIGN PATENT DOCUMENTS

| CN | 102984393 A | 3/2013 |
|---|---|---|
| CN | 103577089 A | 2/2014 |

(Continued)

OTHER PUBLICATIONS

International Search Report in Application No. PCT/CN2018/082771, of the State Intellectual Property Office of the P.R. China, Beijing, China, dated Jun. 14, 2018.

(Continued)

*Primary Examiner* — Rayeez R Chowdhury
(74) *Attorney, Agent, or Firm* — Finnegan, Henderson, Farabow, Garrett & Dunner, L.L.P.

(57) ABSTRACT

A file transfer method includes: detecting a file drag operation for dragging an icon of a file onto an icon of a target device; acquiring data of the file in response to detecting the file drag operation, and transferring the data to the target device.

20 Claims, 7 Drawing Sheets

(56) References Cited

U.S. PATENT DOCUMENTS

| | | | |
|---|---|---|---|
| 2010/0005138 A1* | 1/2010 | Manzano | H04L 51/00 709/203 |
| 2010/0299728 A1 | 11/2010 | Haff et al. | |
| 2012/0219181 A1* | 8/2012 | Tseng | G06F 16/168 382/103 |
| 2013/0204945 A1 | 8/2013 | Li et al. | |
| 2014/0068469 A1 | 3/2014 | Lee | |
| 2015/0046837 A1 | 2/2015 | Chen | |
| 2017/0168760 A1* | 6/2017 | Smith | G06F 3/123 |
| 2018/0020490 A1* | 1/2018 | Chong | H04L 12/185 |
| 2019/0222632 A1 | 7/2019 | He | |

FOREIGN PATENT DOCUMENTS

| | | |
|---|---|---|
| CN | 103731186 A | 4/2014 |
| CN | 104038263 A | 9/2014 |
| CN | 104468741 A | 3/2015 |
| CN | 104918208 A | 9/2015 |
| CN | 106547455 A | 3/2017 |
| CN | 101834937 A | 9/2020 |
| EP | 1 079 299 A2 | 2/2001 |
| EP | 3 484 134 A1 | 5/2019 |
| EP | 3 675 460 A1 | 7/2020 |
| JP | 2010092455 A | 4/2010 |
| JP | 2012508929 A | 4/2012 |
| JP | 2013025409 A | 2/2013 |
| JP | 2014013567 A | 1/2014 |
| JP | 2015515161 A | 5/2015 |
| KR | 20090039601 A | 4/2009 |
| KR | 20130012225 A | 2/2013 |
| KR | 20150145174 A | 12/2015 |
| RU | 2010147632 A | 5/2012 |
| WO | WO 2018/196621 A1 | 11/2018 |
| WO | WO 2019/071872 A1 | 4/2019 |

OTHER PUBLICATIONS

Extended European Search Report in the European Application No. 19212484.0, dated May 28, 2020.

First Office Action of the Russian Application No. 2019141051/28, dated Jun. 22, 2020.

English version of International Search Report in Application No. PCT/CN2019/110484, of the China National Intellectual Property Administration (ISA/CN), dated Feb. 6, 2020.

First Office Action of Korean Application No. 10-2019-7033847, dated Oct. 27, 2020.

International Search Report of counterpart PCT Application No. PCT/CN2019/110484, dated Feb. 6, 2020.

First Office Action of Chinese Application No. 201910419550.X, dated Apr. 8, 2021.

Notice of Reasons for Refusal of Japanese Application No. 2019-562562, dated Sep. 17, 2021.

Office Communication for European Application No. 19 212 484.0, dated Feb. 18, 2022.

AirDrop, Apr. 25, 2022; retrieved from https//baike.baidu.com/item/AirDrop/11004046?fr=aladdin, 5 pages.

Decision of Refusal of Japanese Application No. 2019-562562, dated Apr. 28, 2022.

* cited by examiner

FILE TRANSFER METHOD AND APPARATUS

CROSS-REFERENCE TO RELATED APPLICATION

This application is based upon and claims priority to Chinese Patent Application No. 201910419550.X, filed on May 20, 2019, the entire contents of which are incorporated herein by reference.

TECHNICAL FIELD

The present disclosure relates to the field of communication, and more particular, to a file transfer method and a file transfer apparatus.

BACKGROUND

With the development of mobile terminal technology, mobile terminals have become indispensable equipment in people's daily lives. File transfers often need to be made between mobile terminals or between mobile terminals and other terminals. A traditional method of transfer is to rely on third-party instant messaging software to achieve file transfer. It may be necessary to install and use the instant messaging software, and it may be inconvenient to perform such transfers.

SUMMARY

The present disclosure provides a file transfer method and a file transfer apparatus, which are capable of simplifying operations of file transfer.

According to a first aspect of the present disclosure, a file transfer method is provided. The method includes: detecting a file drag operation for dragging an icon of a file onto an icon of a target device; acquiring data of the file in response to detecting the file drag operation, and transferring the data to the target device.

According to a second aspect of embodiments of the disclosure, a file transfer apparatus is provided. The apparatus includes: a processor; and a memory configured to store instructions executable by the processor; wherein the processor is configured to: detect a file drag operation for dragging an icon of a file onto an icon of a target device; acquire data of the file in response to detecting the file drag operation; and send the data of the file to the target device.

It should be understood that, the above general description and the following detailed description are merely illustrative and explanatory and cannot be construed as a limit to the present disclosure.

BRIEF DESCRIPTION OF THE DRAWINGS

The accompanying drawings, which are incorporated in and constitute a part of the description, illustrates embodiments in consistent with the present disclosure, and are used to explain the principles of the present disclosure together with the description.

DETAILED DESCRIPTION

Exemplary embodiments will be described in detail herein, examples of which are illustrated in the accompanying drawings. Same reference numbers in different figures refer to same or similar elements unless otherwise indicated in the description. The exemplary embodiments described below do not represent all embodiments consistent with the present invention. Instead, they are merely examples of devices and methods consistent with the invention as recited in the appended claims.

Figure 1:
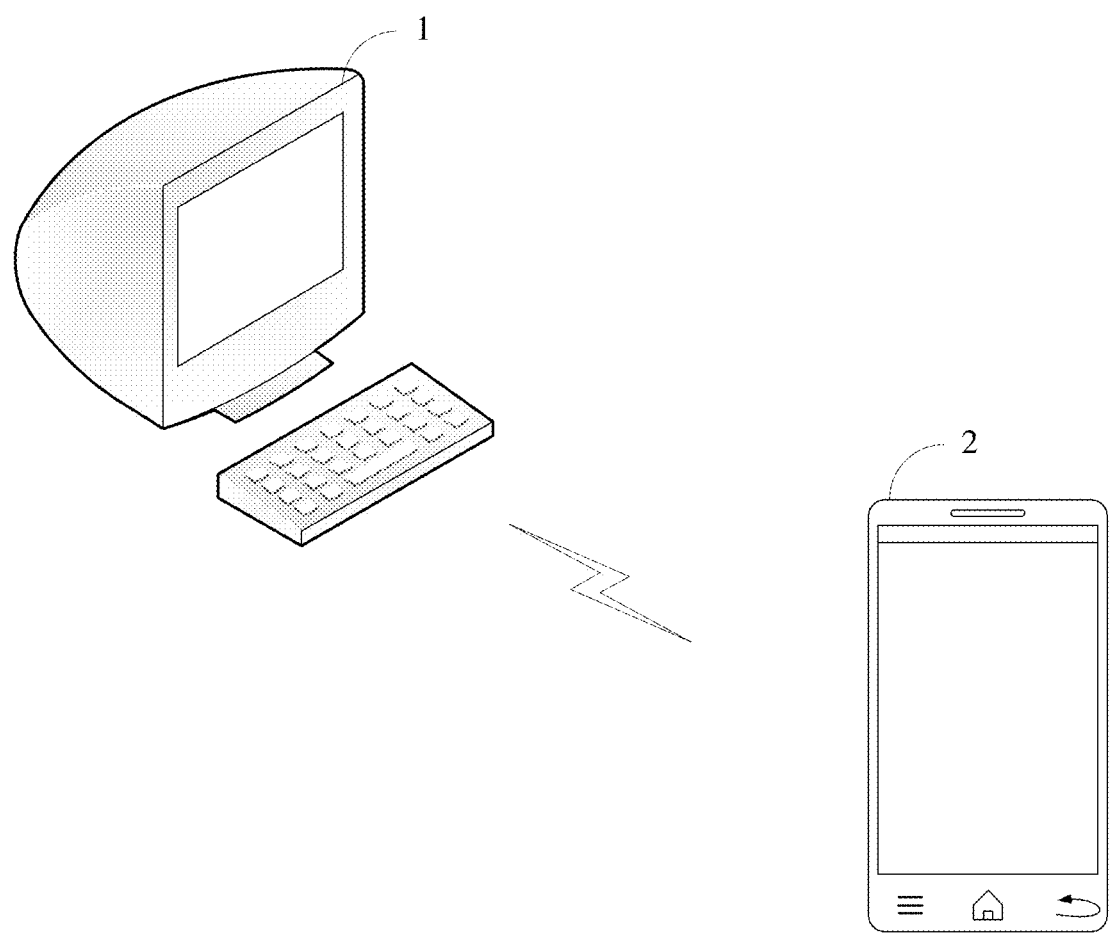
FIG. 1 is an application scenario of a file transfer method according to one exemplary embodiment.

FIG. 1 is an application scenario for a file transfer method according to one exemplary embodiment of the present disclosure. Referring to FIG. 1, there are a terminal device 1 and a terminal device 2 in the application scenario, where the terminal device 1 and the terminal device 2 can be two devices within a certain distance and belong to a single user, and a connection can be established between the two terminal devices. Both the terminal device 1 and the terminal device 2 may be mobile terminals, or may be other terminals, such as a computer.

Figure 2:
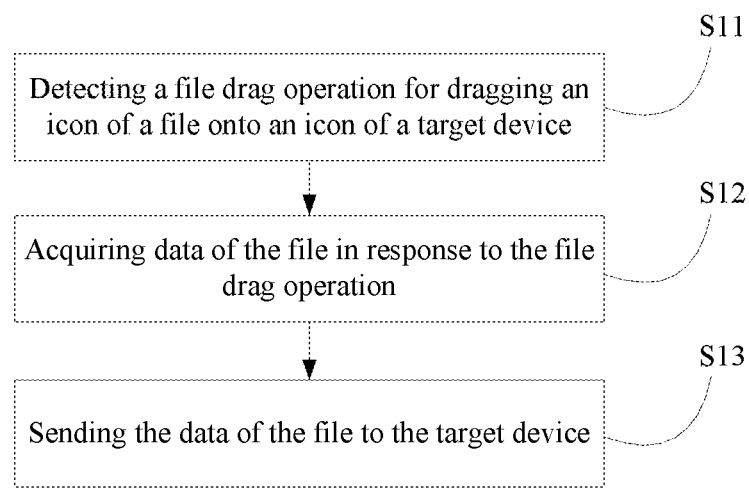
FIG. 2 is a flowchart of a file transfer method according to one exemplary embodiment.

FIG. 2 is a flowchart of the file transfer method according to one exemplary embodiment of the present disclosure. Referring to FIG. 2, the method can be performed by the terminal device 1 or the terminal device 2 in the application scenario illustrated in FIG. 1. The file transfer method may include the following steps.

In step S11, a file drag operation for dragging an icon of a file onto an icon of a target device is detected.

The file drag operation is used to drag an icon of a file onto an icon of a target device.

The file can be any type of file such as a picture, a document, a program installation package, a video, etc. A small picture or a document can be transferred through the file transfer method, and a large program installation package or a video can also be transferred through the file transfer method. The file transfer method has various utilities.

The icon of the file is a graphic that the terminal device presents to the user to represent the visualization of the file.

In step S12, data of the file is acquired in response to the file drag operation.

The data of the file may include all the data constituting the file, and the data of the file is stored in a storage unit of the terminal device.

In step S13, the data of the file is sent to the target device.

In the embodiment of the present disclosure, the file transfer can be implemented based on, but not limited to, a local area network transmission protocol, a wireless high fidelity (WiFi) direct connection, a hot spot, a Bluetooth, and the like.

For example, the file can be sent through WiFi direct connection technology. On one hand, the WiFi direct connection does not require an intermediate medium point, and on the other hand, the WiFi transmission speed is fast, and the transmission speed of a video stream can be guaranteed.

In the embodiments of the present disclosure, the file is transferred by dragging the file onto the icon of the target device, the process is simple, and third-party instant messaging software is not required to be installed on the terminal device, the file transfer process is simplified and is convenient to operate.

In an embodiment, detecting the file drag operation includes: when a locally stored file is selected, detecting the file drag operation for the selected file.

In the embodiment, the file drag operation is detected only when the locally stored file is selected, thereby avoiding wasting resources due to continuous detections.

In an embodiment, detecting the file drag operation includes: if an end of a trajectory to which an icon of the ile is dragged overlaps a position of the icon of the target device, determining that the ile drag operation is detected. In an embodiment, detecting the ile drag operation includes: if a trigger event generated by that the icon of the target device is pressed is detected during dragging the icon of the file, determining that the file drag operation is detected.

In an embodiment, icons of the target device are classed into two cases, one case is that an icon of the target device corresponds to a position on the desktop, and a file drag operation is generated if the file icon is dragged to the position, and the other case is that an icon of the target device corresponds to a button and a ile drag operation is triggered if the file icon is dragged onto this button. For the two cases as described above, the present disclosure provides the two detection schemes described above to achieve the detection of the ile drag operation.

In an embodiment, the method further includes displaying an icon of the target device on a preset position when the locally stored file is selected.

In this way, the icon of the target device is not required to be displayed all the time, and the user will not be interfered by the icon of the target device during operating the terminal device, and at the same time, the icon of the target device is hidden for saving space on the screen.

In an embodiment, one or more files can be selected in the file drag operation.

In the embodiment, the user may select one file for transfer at a time, or may select multiple files at the same time so as to achieve batch transfer.

In an embodiment, sending the data of the file to the target device includes: acquiring an address of the target device; and sending the data of the file to the target device according to the address of the target device.

In the embodiment, when sending the ile, the address of the target device is first acquired and then the file is sent, whereby simplifying the process of file transfer.

In an embodiment, acquiring the address of the target device includes: determining, according to a relationship between a location area of an interface where the icon of the target device is located and an address of the target device, determining the address of the target device corresponding to a location area where an end of a trajectory in which the icon of the file is dragged is located. In an embodiment, acquiring the address of the target device includes: determining an address of the target device corresponding to a trigger event generated during process of dragging the icon of the file according to a relationship between the trigger event and the address of the target device, wherein the trigger event is generated when the icon of the target device is pressed.

In the embodiments, there are two cases for acquiring the address of the target device. One case is that icons of respective target devices to which the terminal device is connected are at different location areas on the screen (or the desktop), and the target device corresponding to the file can be determined according to a relationship between the location areas of the target devices on the interface and an address of the target device and a location area where the end of the trajectory in which the file is dragged. The other case is that the file dragging operation triggers buttons, and each button corresponds to a trigger event, and the trigger event corresponds to an address of the target device or vice versa, thus, a corresponding target device can be determined according to the trigger event in the terminal device.

In an embodiment, the method further includes displaying a file transfer record in response to the user clicking operation on the icon of the target device.

In the embodiment, the file transfer record is displayed by clicking on the icon of the target device, thereby facilitating determining which files have been transferred.

In an embodiment, the method further includes: sending pairing information by broadcasting; receiving response information sent by the target device, wherein the response information includes identity information, which includes at least one of a user account and the device manufacturer identifier; if the identity information carried by the response information is predetermined identity information, sending a connection establishment request to the target device; and receiving a connection establishment response sent by the target device.

For example, the predetermined identity information may be identity information of the terminal device which transfers the file. The user account refers to a user account that is logged in to the terminal device, and the device manufacturer identifier is used to indicate the manufacturer of the terminal device.

In the embodiment, the connection relationship between the terminal devices is established through pairing and response. In the process of establishing the connection relationship, the user account and/or the device manufacturer identifier are used as the authentication standard, and a connection between the terminal devices which adopts a unified user account and/or device manufacturer identifier can be established automatically, without manual operation, thereby simplifying the process of file transfer. And at the same time, due to the existence of the above authentication process, connection to unauthorized terminal devices may be avoided.

The pairing information may be Bluetooth pairing information, and connection between terminal devices, such as a terminal device and a mobile terminal, is achieved automatically through Bluetooth technology.

In an embodiment, the terminal devices can be connected manually for the first time, and can be connected by the above automatic connection mode during the second and subsequent connections.

Figure 3:
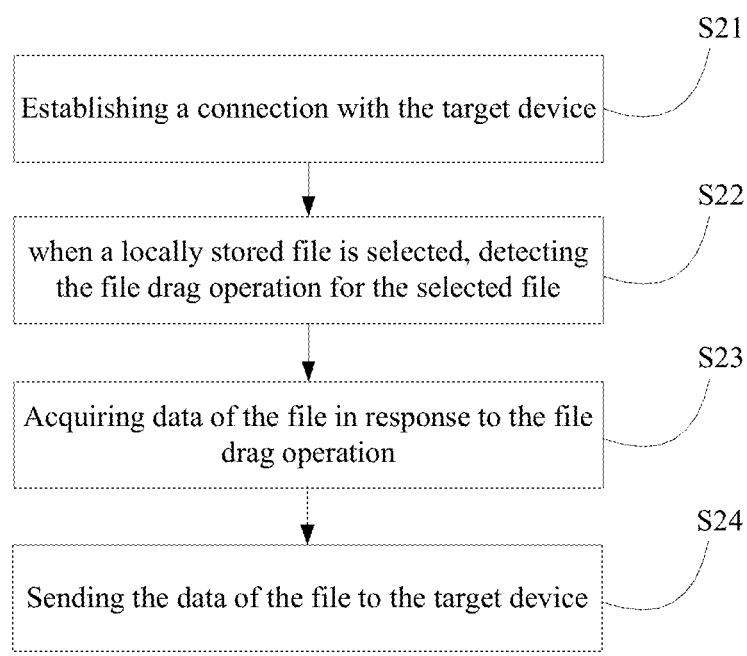
FIG. 3 is a flowchart of a file transfer method according to one exemplary embodiment.

FIG. 3 is a flowchart of a file transfer method according to one exemplary embodiment of the present disclosure. Referring to FIG. 3, the method can be performed by the terminal device 1 or the terminal device 2 in the scenario illustrated in FIG. 1. The file transfer method can include the following steps.

In step S21, a connection with the target device is established.

In the embodiment, the target device may be a peer device for file transfer. For example, when the terminal device 1 is to perform file transfer, the target device may be the terminal device 2. When the terminal device 2 is to perform file transfer, the target device may be the terminal device 1.

In an embodiment, establishing a connection with the target device can include: sending the pairing information through broadcasting; receiving response information sent by the target device, wherein the response information includes identity information, which includes at least one of a user account and a device manufacturer identifier; if the identity information carried by the response information is a predetermined identity information, sending a connection establishment request to the target device; and receiving a connection establishment acknowledgement sent by the target device.

The predetermined identity information may be identity information of the terminal device which transfers the file. The user account refers to a user account that is logged in to the terminal device, and the device manufacturer identifier is used to indicate a manufacturer of the terminal device.

In the embodiment, the connection relationship between the terminal devices is established through pairing and acknowledgement. In the process of establishing the connection relationship, the user account and/or the device manufacturer identifier are used as the authentication standard, and a connection between the terminal devices which adopt a unified user account and/or device manufacturer identifier can be established automatically, without manual operation, thereby simplifying the process of file transfer. And at the same time, due to the existence of the above authentication process, connection to unauthorized terminal devices may be avoided.

The pairing information may be Bluetooth pairing information, and the connection between the terminal devices, e.g., a terminal device and a mobile terminal, is achieved automatically through Bluetooth technology.

For example, the terminal device 1 sends Bluetooth pairing information through broadcasting, and the Bluetooth pairing information includes the user account. When receiving the Bluetooth pairing information, the terminal device 2 verifies whether the user account carried in the Bluetooth pairing information is identical as the user account logged in the terminal device 2, if yes, a response information is returned, the response information includes the user account, otherwise the response information is not returned; the terminal device 1 receives the response information sent by the terminal device 2; the terminal device 1 verifies whether the user account carried in the response information and the user account logged in the terminal device 2 are identical, if yes, the terminal device 1 sends a connection establishment request to the terminal device 2, the terminal device 2 receives the connection establishment request sent by the terminal device 1, the terminal device 2 transmits a connection establishment acknowledgement to the terminal device 1, and the terminal device 1 receives the connection establishment acknowledgement sent by the terminal device 2. If not, the terminal device 1 ends the connection establishment process.

The process of verifying the user account by the terminal device 2 may be an optional step, and the terminal device 2 may send the response information after receiving the Bluetooth pairing information.

In an embodiment, a connection establishing process may be initiated by the terminal device 2, and the terminal device 1 responds.

As described above, in addition to the user account, the Bluetooth pairing information and the response information can further include a manufacturer identifier, and in the connection establishing process, the terminal device 2 and the terminal device 1 verify whether the manufacturer identifiers are identical, in addition to verifying whether the user accounts are identical. For example, when receiving the Bluetooth pairing information, the terminal device 2 verifies whether a user account and a device manufacturer identifier carried by the Bluetooth pairing information are identical as a user account and a device manufacturer identifier of the terminal device 2, and if yes, the terminal device 2 returns a response information, and the response information includes the user account, otherwise no response information will be returned. For another example, when receiving the Bluetooth pairing information, the terminal device 2 verifies whether a user account and a device manufacturer identifier carried by the Bluetooth pairing information are identical as a local user account and a local device manufacturer identifier of the terminal device 1, and if yes, the terminal device 1 sends a connection establishment request, and the terminal device 2 receives the connection establishment request sent by the terminal device 1. Otherwise, the terminal device 1 does not send a connection establishment request.

The device manufacturer identifier is carried in the pairing information and the response information, whereby ensuring that the products manufactured by the same manufacturer can adopt the automatic connection mode so as to ensure that both terminal devices have the file drag transfer function.

It should be noted that the step S21 can be repeatedly performed, that is, one terminal device can be connected to multiple terminal devices.

In step 22, when a locally stored file is selected, the file drag operation for the selected file is detected.

The file drag operation is used to drag an icon of a file onto an icon of a target device.

In the embodiment, the file can be any type of file such as a picture, a document, a program installation package, a video, etc. A picture or a document with small size can be transferred through the file transfer method, and a program installation package or a video with great size can also be transferred through the file transfer method. The file transfer method has various utilities.

The icon of the file is a graphic that the terminal device presents to the user to represent the visualization of the file.

In the embodiment, the file drag operation is detected only when the locally stored file is selected, thereby avoiding wasting resources due to continuous detections.

In one embodiment of the present disclosure, detecting the file drag operation includes: if an end of a trajectory in which the icon of the file is dragged overlaps a position of the icon of the target device, determining that the file drag operation is detected.

In the embodiment, the location of the icon of the target device is stored in the terminal device, and it is only required to compare the location of the end of the trajectory in which the icon of the file is dragged with the locations of the icons of the respective target devices on the terminal device. Here, the location of the icon of the target device is a location area, and it is only required that the end of the trajectory in which the icon of the file is dragged is in the location area of the icon of the target device.

In another embodiment of the present disclosure, detecting the file drag operation includes: if a trigger event that is generated by pressing an icon of the target device is detected, determining that the file drag operation is detected.

In this embodiment, the icon of the target device is a button, and when the icon of the file is dragged onto the button and is released, during the process, there is a pressing action on the button, when the pressing action occurs, a trigger event is generated. If the terminal device detects the trigger event, it is determined that a file drag operation is detected.

In the embodiment, icons of the target device are classed into two cases, one case is that the icon of the target device corresponds to a position on the desktop, and a file drag operation is generated if the file icon is dragged to the position, and the other case is that the icon of the target device corresponds to a button and a file drag operation is triggered if the file icon is dragged onto this button. For the two cases as described above, the present disclosure provides the two detection schemes described above to achieve the detection of the file drag operation.

In an embodiment of the present disclosure, the method further includes displaying the icon of the target device on a preset position when the locally stored file is selected. In this way, the icon of the target device is not required to be displayed all the time, and the user will not be interfered by the icon of the target device during operating the terminal device, and at the same time, the icon of the target device is hidden for saving space on the screen.

Further, the method can further include: when the file transfer is completed and the file transfer operation is not performed over a set time, the icon of the target device is hidden.

Figure 4:
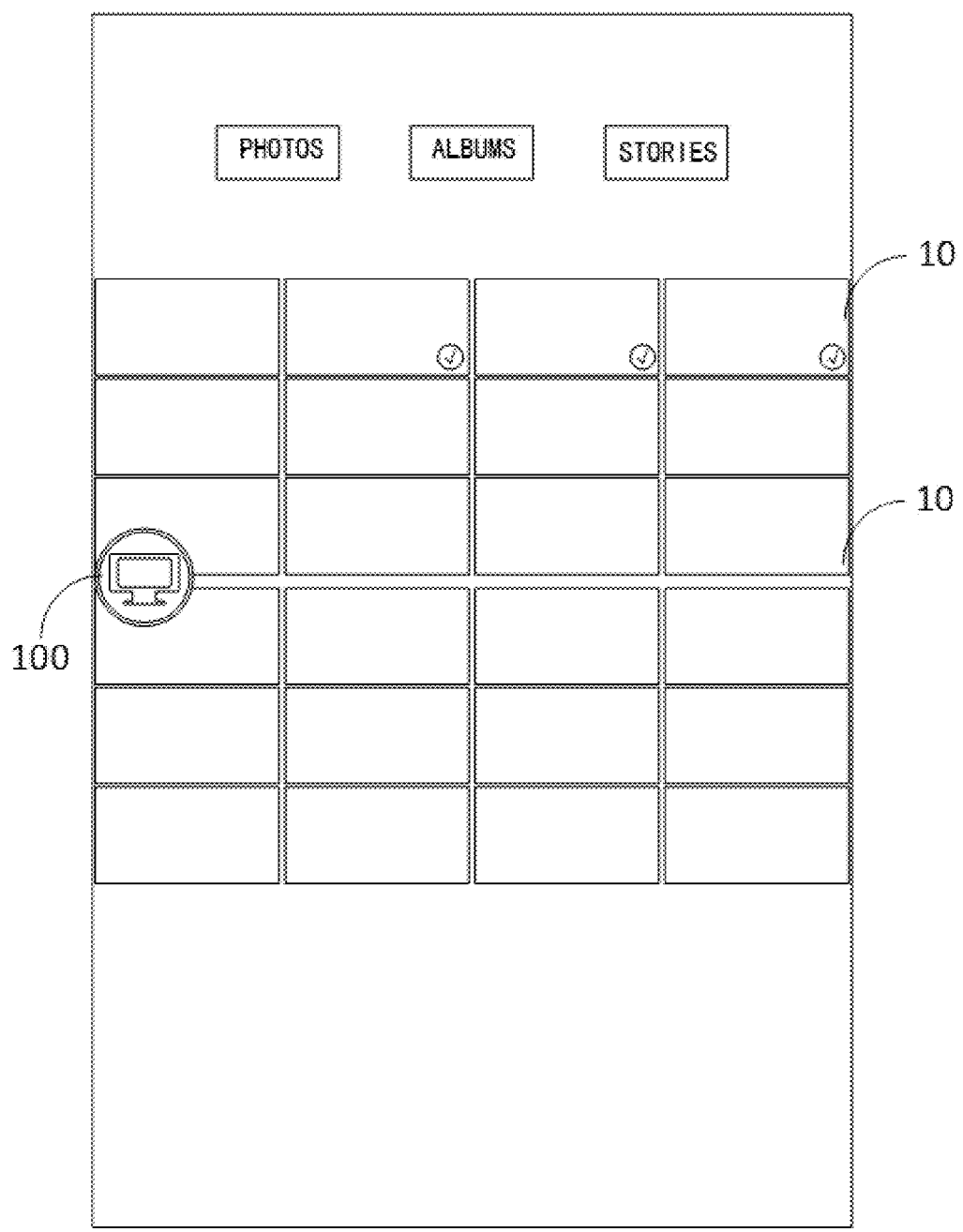
FIG. 4 is an interface diagram of a terminal device according to one exemplary embodiment.
Figure 5:
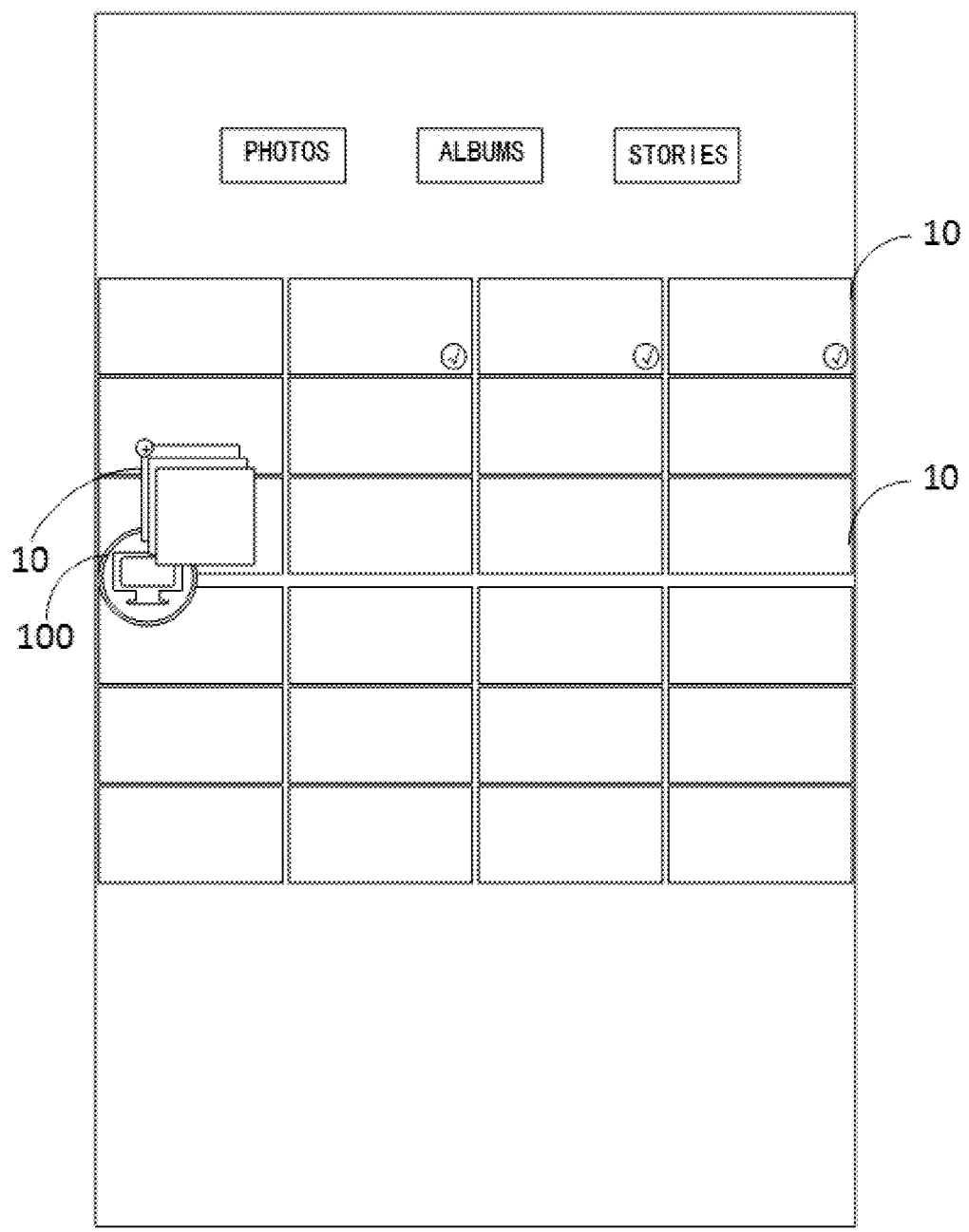
FIG. 5 is an interface diagram of a terminal device according to one exemplary embodiment.

FIG. 4 is an interface diagram of a terminal device according to an exemplary embodiment. As illustrated in FIG. 4, when a user uses a terminal device, e.g., a mobile terminal, to transfer a photo, the user first enters a photo folder in which a plurality of photo files 10 are displayed. By clicking on 3 photos (checked parts), the photos to be transferred are selected. At this time, the terminal device detects that files are selected, and displays an icon 100 of a target device at a preset position. The user drags the icons of the files 10 onto the icon 100 of the target device through a file drag operation, as illustrated in FIG. 5. Here, in the process of dragging the icon of the files 10, the original icons of the files 10 may not be moved, and a dragged icon of the files 10 additionally appear, and when the drag operation ends, the dragged icon disappears. The preset location may be any predetermined location determined in advance; or may be a blank location on the desktop of the terminal device, such that the icon of the target device does not obscure other content on the desktop.

Referring back to FIG. 2, in step S23, data of the file is acquired in response to the file drag operation.

The data of the file may include all the data constituting the file, and the data of the file is stored in a storage unit of the terminal device.

In the embodiment of the present disclosure, acquiring the data of the file can include: acquiring a storage address of the selected file; and acquiring the data of the file from the storage address of the selected file. The storage address of the file is a physical storage address of the selected file in the terminal device, which is determined when the user selects the file. Because in the terminal device, a folder where the file is located may need to be determined in advance during the user selects the file, and a combination of the folder where the file is located and a name of the file corresponds to the physical storage address of the file.

In step S24, the data of the file is sent to the target device.

In an embodiment of the present disclosure, one or more files can be selected in the file drag operation. In the embodiment, the user may select one file for transfer at a time, or may select multiple files at the same time so as to achieve batch transfer. For example, as illustrated in FIG. 4 and FIG. 5, the files selected in the file drag operation include 3 files.

In an embodiment, sending the data of the file to the target device includes: acquiring an address of the target device; and sending the data of the file to the target device according to the address of the target device.

In the embodiment, when sending the file, the address of the target device is first acquired and then the file is sent, whereby simplifying the process of file transfer. For example, the address of the target device may be an Internet Protocol (IP) address or a UUID (Universally Unique IDentifier) of a Bluetooth device. The address of the target device can be acquired during the process of establishing a connection with the target device.

In an embodiment, acquiring the address of the target device includes: determining, according to a relationship between a location area of an interface where the icon of the target device is located and an address of the target device, the address of the target device corresponding to the location area where an end of a trajectory in which the icon of the file is dragged is located. In an embodiment, acquiring the address of the target device includes: determining an address of the target device corresponding to a trigger event generated during process of dragging the icon of the file according to a relationship between the trigger event and the address of the target device, wherein the trigger event is generated when the icon of the target device is pressed.

In the embodiments, there are two cases for acquiring the address of the target device. One case is that icons of respective target devices to which the terminal device is connected are at different location areas on the screen (or the desktop), and the target device corresponding to the file can be determined according to a relationship between the location area of the icon of the target device on the interface and an address of the target device, and a location area where the end of the trajectory in which the file is dragged. The other case is that the file dragging operation triggers buttons, and each button corresponds to a trigger event, and the trigger event corresponds to an address of the target device or vice versa, thus, a corresponding target device can be determined according to the trigger event in the terminal device.

In the embodiment of the present disclosure, a relationship between the location area of the interface where the icon of the target device is located and the address of the target device or a relationship between the trigger event and the address of the target device can be stored in the terminal device.

For example, the location area of the interface where the icon of the target device is located or the trigger event can be preset. After establishing a connection with the target device, the location area or the trigger event is associated with the target device in sequence, so as to obtain a relationship between the location area and the target device or a relationship between the trigger event and the target device.

For example, the interface where the icon of the target device is located is also the desktop of the terminal device. For example, a location area of the interface is an area that the icon of the target device covers on the desktop of the terminal device.

Further, the method further includes: when the file for the target device is selected, detecting a drag operation for the file; and taking a position at the end of the drag operation (the end of the trajectory of the drag operation) as a position of an icon of the target device, and displaying the icon of the target device on the position of the icon of the file after the dragging.

A relationship between the location area of the interface where the icon of the target device is located and the address of the target device can be updated after the position of the icon of the target device changes.

In the embodiment of the present disclosure, the file transfer can be implemented based on, but not limited to, a local area network transmission protocol, a wireless high fidelity (WiFi) direct connection, a hot spot, a Bluetooth, and the like.

For example, the file can be sent through WiFi direct connection technology. On one hand, the WiFi direct connection does not require an intermediate medium point, and on the other hand, the WiFi transmission speed is fast, and the transmission speed of a video stream can be guaranteed.

On the side of the target device, an identifier of the peer device (the sending terminal device) can also be displayed on the target device, and the target device automatically receives the file sent by the peer device and then saves it, without receiving confirmation by the user, thus no manual operation is required. And further, such file transfer usually occurs between different devices of the same user, or of two users face to face, and there is no security issue even without receiving confirmation.

In the embodiment of the present disclosure, for the terminal device sending the file or the target device, following steps can be performed: in response a clicking operation on the icon of the target device (or the peer device) by the user, displaying file transfer record. In the embodiment, the file transfer record can be displayed by clicking the icon of the target device, thereby facilitating determining which files have been transferred.

In the embodiment, the icon of the target device can be taken as a button, and the file transfer record is displayed when the button is clicked. The file transfer record can include a file name, a file size, a transfer time, and the like. This makes it easy to determine which files have been transferred. In addition to displaying the file transfer record, status of the file in current process can further be displayed, and the status of the file in current process include file a name, a file size, a percentage transmitted, a transfer speed, and etc.

The file transfer record can be displayed on a pop-up interface. The pop-up interface includes a close button, and when the user clicks the close button, the terminal device receives a command of close, and then the pop-up interface is closed.

Figure 6:
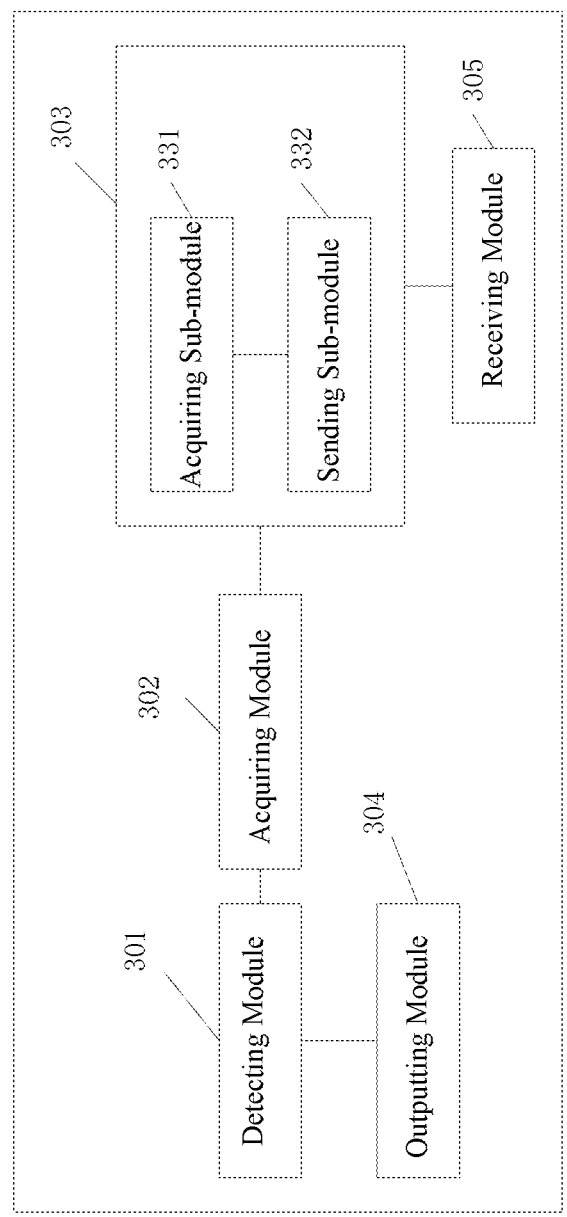
FIG. 6 is a schematic diagram of a file transfer device according to one exemplary embodiment.

FIG. 6 is a schematic diagram of a file transfer device according to one exemplary embodiment of the present disclosure. As illustrated in FIG. 6, the file transfer device includes: a detecting module 301, an acquiring module 302, and a sending module 303.

The detecting module 301 is configured to detect a file drag operation for dragging an icon of a file onto an icon of a target device, the acquiring module 302 is configured to acquire data of the file in response to the detected file drag operation, and the sending module 303 is configured to transfer the data of the file to the target device.

In an embodiment, the detecting module 301 is configured to: when a locally stored file is selected, detect the file drag operation for the selected file.

In an embodiment, the detecting module 301 is configured to determine that a file drag operation is detected if an end of a trajectory to which an icon of the file is dragged overlaps a position of the icon of the target device. In an embodiment, the detecting module 301 is configured to determine that a file drag operation is detected if a trigger event generated by that the icon of the target device is pressed is detected during dragging the icon of the file.

In an embodiment, the device further includes an outputting module 304, configured to display an icon of the target device on a preset position when the locally stored file is selected.

In an embodiment, the selected file in the file drag operation includes at least one file.

In an embodiment, the sending module 303 includes: an acquiring sub-module 331, configured to acquire an address of the target device; and a sending sub-module 332, configured to send the data of the file to the target device according to the address of the target device.

In an embodiment, the acquiring sub-module 331 is configured to determine an address of the target device corresponding to a location area where an end of a trajectory in which the icon of the file is dragged is located according to a relationship between a location area of an interface where the icon of the target device is located and an address of the target device. In an embodiment, the acquiring sub-module 331 is configured to determine an address of the target device corresponding to a trigger event generated during process of dragging the icon of the file according to a relationship between the trigger event and the address of the target device, wherein the trigger event is generated when the icon of the target device is pressed.

In an embodiment, the outputting module 304 is configured to display a file transfer record in response to clicking operation on the icon of the target device by the user.

In an embodiment, the device further includes a sending module 303, configured to send pairing information through broadcasting; a receiving module 305, configured to receive response information sent by the target device, wherein the response information includes identity information, which includes at least one of a user account and a device manufacturer identifier; the sending module 303 is further configured to send a connection establishment request to the target device if a user account carried by the response information is identical to a locally used user account; and the receiving module 305 is further configured to receive a connection establishment acknowledgement sent by the target device.

For the manner in which the detection module 301 detects the file drag operation, refer to step S22. For the manner in which the acquiring module 302 acquires the data of the file, refer to step S23. And for the manner in which the sending module 303 sends the data of the file, refer to step S24, and detailed description is not repeated here.

Figure 7:
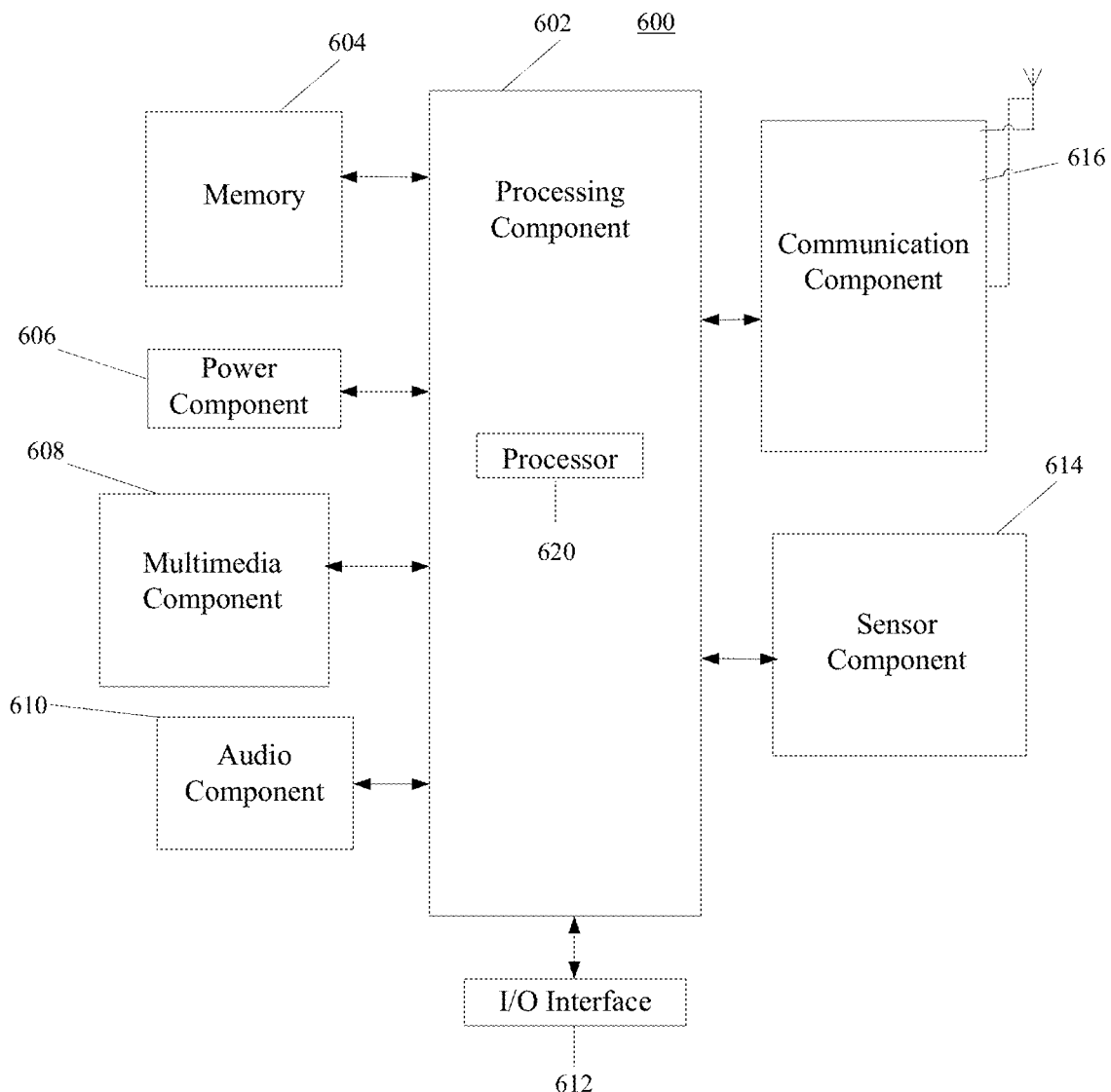
FIG. 7 is a block diagram of a file transfer apparatus according to one exemplary embodiment.

FIG. 7 is a block diagram of a file transfer apparatus 600 according to an exemplary embodiment of the present disclosure. The file transfer apparatus 600 can be any of the terminal devices described above. As illustrated in FIG. 7, the file transfer apparatus 600 can include one or more of the following components: a processing component 602, a memory 604, a power component 606, a multimedia component 608, an audio component 610, an input/output (I/O) interface 612, a sensor component 614, and a communication component 616.

The processing component 602 typically controls the overall operation of the file transfer apparatus 600, such as operations associated with display, telephone calls, data communications, camera operations, and recording operations. The processing component 602 can include one or more processors 620 to execute instructions to perform all or part of the steps of the method as described above. Moreover, the processing component 602 can include one or more modules to facilitate interaction between the processing component 602 and other components. For example, the processing component 602 can include a multimedia module to facilitate interaction between the processing component 602 and the multimedia component 608.

The memory 604 is configured to store various types of data to support operation at the file transfer apparatus 600. Examples of such data include any application or instructions for method run on the file transfer apparatus 600, contact data, phone book data, messages, pictures, videos, and the like. The memory 604 can be implemented by any type of volatile or non-volatile storage device, or a combination thereof, such as static random access memory (SRAM), electrically erasable programmable read only memory (EEPROM), erasable, Programmable Read Only Memory (EPROM), Programmable Read Only Memory (PROM), Read Only Memory (ROM). Magnetic Memory, Flash Memory, magnetic disk or Optical Disk.

The power component 606 supplies power to various components of the file transfer apparatus 600. The power component 606 can include a power management system, one or more power sources, and other components associated with generating, managing, and distributing power for the apparatus 600.

The multimedia component 608 includes a screen between the file transfer apparatus 600 and the user that provides an output interface. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, slides, and gestures on the touch panel. The touch sensor can sense not only boundary of the touch or the sliding action, but also duration and pressure associated with the touch or the sliding operation.

The audio component 610 is configured to output and/or input an audio signal. In some embodiments, the audio component 610 includes a speaker for outputting an audio signal.

The I/O interface 612 provides an interface between the processing component 602 and peripheral interface modules, which may be a keyboard, a click wheel, a button, or the like. These buttons can include, but are not limited to, a home button, a volume button, a start button, and a lock button.

The sensor component 614 includes one or more sensors for providing the file transfer apparatus 600 with status assessment in various aspects. For example, when the smart device is a smart air conditioner, the sensor component 614 can include a humidity sensor, a temperature sensor, and the like.

The communication component 616 is configured to facilitate wireless communication between the file transfer apparatus 600 and other devices. The communication component 616 can access a wireless network based on a communication standard, such as WiFi, 4G or 5G, or a combination thereof, so as to achieve detection of physical downlink control signaling. In an exemplary embodiment, the communication component 616 receives broadcast signals or broadcast associated information from an external broadcast management system via a broadcast channel. In an embodiment, the communication component 616 further includes an NFC module.

In an exemplary embodiment, the file transfer apparatus 600 can be implemented by one or more application specific integrated circuits (ASICs), digital signal processors (DSPs), digital signal processing devices (DSPDs), programmable logic devices (PLDs), field programmable gate array (FPGA), controller, microcontroller, microprocessor, or other electronic component implementation for performing the file transfer methods as described above.

In an exemplary embodiment, there is further provided a non-transitory computer readable storage medium including instructions, such as the memory 604 including instructions executable by the processor 620 of the file transfer apparatus 600 to perform the file transfer method as described above. For example, the non-transitory computer readable storage medium can be a ROM, a random access memory (RAM), a CD-ROM, a magnetic tape, a floppy disk, and an optical data storage device.

Other embodiments of the present disclosure will be apparent to one of ordinary skill in the art after considering the specification and practicing the embodiments disclosed herein. The present disclosure is intended to cover any variations, applications, or adaptive modifications of the present disclosure, which are in accordance with the general principles of the disclosure and include common general knowledge or common technical means in the art that are not disclosed in the present disclosure. The specification and embodiments are merely illustrative, and the protection scope and the spirit of the present disclosure are set forth by the claims.

It should be understood that the present disclosure is not limited to the details illustrated in the figures and described in the specification, and various variations and modifications can be made without departing the scope of the present disclosure. And the scope of the present disclosure is only limited by the appended claims. The scope of the disclosure is to be limited only by the appended claims.

What is claimed is:

1. A file transfer method, comprising:
    sending, by a terminal device, pairing information through broadcasting;
    receiving response information to the broadcasting sent by a target device, wherein the response information to the broadcasting comprises identity information of the target device, and the identity information comprises at least one of a user account that is logged in to the target device and a device manufacturer identifier of the target device;
    determining whether the identity information carried by the response information to the broadcasting and identity information of the terminal deice are unified, and in response to the identity information carried by the response information to the broadcasting and the identity information of the terminal deice being unified, sending a connection establishment request to the target device;
    receiving a connection establishment acknowledgement sent by the target device in response to the connection establishment request;
    detecting a file drag operation for dragging an icon of a file onto an icon of the target device;
    acquiring data of the file in response to the file drag operation; and
    sending the data of the file to the target device.

2. The file transfer method according to claim 1, further comprising:
    when a locally stored file is selected, detecting the file drag operation for the selected file.

3. The file transfer method according to claim 1, wherein detecting the file drag operation comprises at least one of:
    determining that the file drag operation is detected, if an end of a trajectory in which the icon of the file is dragged overlaps a position of the icon of the target device; or determining that the file drag operation is detected, if a trigger event generated by the icon of the target device being pressed is detected during dragging the icon of the file.

4. The file transfer method according to claim 1, further comprising:
displaying the icon of the target device on a preset position when a locally stored file is selected.

5. The file transfer method according to claim 1, wherein one or more files are selected in the file drag operation.

6. The file transfer method according to claim 1, wherein sending the data of the file to the target device comprises:
acquiring an address of the target device; and
sending the data of the file to the target device according to the address of the target device.

7. The file transfer method according to claim 6, wherein acquiring the address of the target device comprises at least one of:
determining the address of the target device corresponding to a location area where an end of a trajectory in which the icon of the file is dragged is located according to a relationship between a location area of an interface where the icon of the target device is located and the address of the target device; or
determining the address of the target device corresponding to a trigger event generated during a process of dragging the icon of the file according to a relationship between the trigger event and the address of the target device, wherein the trigger event is generated when the icon of the target device is pressed.

8. The file transfer method according to claim 1, further comprising:
displaying a file transfer record in response to clicking operation on the icon of the target device by the user.

9. The file transfer method according to claim 2, wherein sending the data of the file to the target device comprises:
acquiring an address of the target device; and
sending the data of the file to the target device according to the address of the target device.

10. The file transfer method according to claim 9, wherein acquiring the address of the target device comprises at least one of:
determining the address of the target device corresponding to a location area where an end of a trajectory in which the icon of the file is dragged is located according to a relationship between a location area of an interface where the icon of the target device is located and the address of the target device; or
determining the address of the target device corresponding to a trigger event generated during a process of dragging the icon of the file according to a relationship between the trigger event and the address of the target device, wherein the trigger event is generated when the icon of the target device is pressed.

11. A file transfer apparatus, comprising:
a processor; and
a memory configured to store instructions executable by the processor;
wherein the processor is configured to:
send pairing information through broadcasting;
receive response information to the broadcasting sent by a target device, wherein the response information to the broadcasting comprises identity information of the target device, and the identity information comprises at least one of a user account that is logged in to the target device and a device manufacturer identifier of the target device;
determine whether the identity information carried by the response information to the broadcasting and identity information of the file transfer apparatus are unified, and in response to the identity information carried by the response information to the broadcasting and the identity information of the file transfer apparatus are unified, send a connection establishment request to the target device;
receive a connection establishment acknowledgement sent by the target device in response to the connection establishment request;
detect a file drag operation for dragging an icon of a file onto an icon of the target device;
acquire data of the file in response to the file drag operation; and
send the data of the file to the target device.

12. The file transfer apparatus according to claim 11, wherein when a locally stored file is selected, the processor is further configured to detect the file drag operation for the selected file.

13. The file transfer apparatus according to claim 11, wherein the processor is further configured to perform at least one of:
determining that the file drag operation is detected if an end of a trajectory in which the icon of the file is dragged overlaps a position of the icon of the target device; or
determining that the file drag operation is detected if a trigger event generated by the icon of the target device being pressed is detected during dragging the icon of the file.

14. The file transfer apparatus according to claim 11, wherein the processor is further configured to display the icon of the target device on a preset position when a locally stored file is selected.

15. The file transfer apparatus according to claim 12, wherein one or more files are selected in the file drag operation.

16. The file transfer apparatus according to claim 11, wherein the processor is further configured to acquire an address of the target device and send the data of the file to the target device according to the address of the target device.

17. The file transfer apparatus according to claim 16, wherein the processor is further configured to perform at least one of:
determining the address of the target device corresponding to a location area where an end of a trajectory in which the icon of the file is dragged is located according to a relationship between a location area of an interface where the icon of the target device is located and the address of the target device; or
determining the address of the target device corresponding to a trigger event generated during a process of dragging the icon of the file according to a relationship between the trigger event and the address of the target device, wherein the trigger event is generated when the icon of the target device is pressed.

18. The file transfer apparatus according to claim 11, wherein the processor is further configured to display a file transfer record in response to a clicking operation on the icon of the target device.

19. The method according to claim 1, further comprising:
in response to receiving the connection establishment acknowledgement sent by the target device, displaying the icon of the target device on the terminal device; and after the data of the file is sent to the target device, cancelling the displaying of the icon of the target device on the terminal device if no further file transfer operation is performed over a set period of time.

20. The method according to claim 1, wherein the pairing information sent by the terminal device through broadcasting comprises the identity information of the terminal deice, the identity information of the terminal device comprises a user account that is logged in to the terminal device and a device manufacturer identifier of the terminal device, and receiving response information to the broadcasting sent by the target device comprises:

determining, by the target device, whether the identity information of the terminal device and the identity information of the target device are unified, and in response to the identity information of the terminal device and the identity information of the target device being unified, sending, by the target device, the response information to the terminal device.

* * * * *